US006669615B2

(12) United States Patent
DeMatteis

(10) Patent No.: US 6,669,615 B2
(45) Date of Patent: Dec. 30, 2003

(54) PLASTIC FILM HINGING AND PRE-CREASING PROCESS

(75) Inventor: Robert B. DeMatteis, Grass Valley, CA (US)

(73) Assignee: Bob DeMatteis Co., Grass Valley, CA (US)

( * ) Notice: Subject to any disclaimer, the term of this patent is extended or adjusted under 35 U.S.C. 154(b) by 140 days.

(21) Appl. No.: 09/967,428

(22) Filed: Sep. 27, 2001

(65) Prior Publication Data

US 2002/0009575 A1 Jan. 24, 2002

Related U.S. Application Data

(62) Division of application No. 09/267,345, filed on Feb. 25, 1999, now abandoned.
(60) Provisional application No. 60/088,613, filed on Jun. 9, 1998, provisional application No. 60/088,612, filed on Jun. 9, 1998, provisional application No. 60/089,582, filed on Jun. 17, 1998, provisional application No. 60/089,583, filed on Jun. 17, 1998, provisional application No. 60/092,232, filed on Jul. 9, 1998, and provisional application No. 60/092,233, filed on Jul. 9, 1998.

(51) Int. Cl.[7] .............................................. B31B 49/04
(52) U.S. Cl. ........................ 493/194; 493/142; 493/197; 493/215
(58) Field of Search ................................ 493/194, 197, 493/207, 215, 217, 143; 264/320, 295

(56) References Cited

U.S. PATENT DOCUMENTS

| | | | |
|---|---|---|---|
| 3,042,562 A | 7/1962 | Peterson | 428/167 |
| 3,649,398 A * | 3/1972 | Keith | |
| 3,687,170 A * | 8/1972 | Malone et al. | |
| 3,900,550 A | 8/1975 | Oliver et al. | 428/167 |
| 4,135,023 A | 1/1979 | Lloyd et al. | 428/167 |
| 4,298,647 A | 11/1981 | Cancio et al. | 428/167 |
| 4,391,303 A | 7/1983 | Holgersson | 428/167 |
| 4,480,750 A | 11/1984 | Dancy | |
| 4,529,090 A | 7/1985 | Pilon | |
| 4,582,555 A * | 4/1986 | Bower | |
| D287,572 S | 1/1987 | Dancy | |
| D288,779 S | 3/1987 | Pilon | |
| 4,676,378 A | 6/1987 | Baxley | |
| 4,696,403 A | 9/1987 | Hoover | |
| 4,786,275 A | 11/1988 | Hoover | |
| 4,793,539 A | 12/1988 | Haenni | |
| 4,807,754 A | 2/1989 | Rowe | |

(List continued on next page.)

Primary Examiner—Eugene Kim
Assistant Examiner—Sameh Tawfik
(74) Attorney, Agent, or Firm—Willaim Michael Hynes; Townsend and Townsend and Crew, LLP

(57) ABSTRACT

A hinge is disclosed for a plastic film. This film has a predetermined thickness sufficient for the plastic film to remain planar in an absence of a first bending moment applied across the plastic film. The hinge includes at least one linear groove configured in the plastic film to reduce the predetermined thickness of the plastic film at the linear groove. The hinge permits preferential hinging of the plastic film at the linear groove responsive to a bending moment at the linear groove across the plastic film less than the first bending moment. The linear groove has insufficient depth to sever the plastic film and enables the hinge film to retain sufficient remaining thickness at the linear groove to permit hinging and not tearing of the plastic film at the linear groove. When the hinge is placed across a plastic film, and the film bent at the hinge, the film defines a first panel and a second panel with each panel disposed at an angle to one another at the hinge. This allows the first panel and the second panel to form a three dimensional structure to maintain the plastic film of each panel against bending. A square bottom bag design is disclosed where the hinge predisposes a plastic bag to open with a square bottom.

7 Claims, 10 Drawing Sheets

U.S. PATENT DOCUMENTS

| | | |
|---|---|---|
| 4,819,899 A | 4/1989 | Weil |
| 4,849,090 A | 7/1989 | Case |
| 4,872,766 A | 10/1989 | Dancy |
| 4,911,560 A | 3/1990 | Hoover |
| D307,555 S | 5/1990 | Haenni |
| D308,170 S | 5/1990 | Wilfong |
| 4,923,436 A | 5/1990 | Gelbard |
| 4,925,512 A | 5/1990 | Briand |
| 4,930,385 A | 6/1990 | Wilfong |
| RE33,264 E | 7/1990 | Baxley |
| 4,953,664 A | 9/1990 | Vrooman |
| 4,981,216 A | 1/1991 | Wilfong |
| 4,995,860 A | 2/1991 | Wilfong |
| 5,019,027 A * | 5/1991 | Boeckmann et al. ....... 493/207 |
| 5,020,750 A | 6/1991 | Vrooman |
| D323,619 S | 2/1992 | Wilfong |
| D325,311 S | 4/1992 | Mygind |
| 5,125,604 A | 6/1992 | Vrooman |
| 5,207,367 A | 5/1993 | Dunn |
| 5,207,368 A | 5/1993 | Wilfong, Jr. et al. |
| RE34,324 E | 7/1993 | Haenni |
| 5,335,788 A | 8/1994 | Beasley |
| 5,362,152 A | 11/1994 | Fletcher |
| 5,562,580 A | 10/1996 | Beasley |
| 5,604,021 A | 2/1997 | Wagner ...................... 428/167 |
| 5,667,173 A | 9/1997 | Wilfong |
| D396,636 S | 8/1998 | Wilfong |
| 5,843,353 A | 12/1998 | De Vos et al. ................ 428/71 |
| 5,845,779 A | 12/1998 | Wilfong |
| 5,881,882 A | 3/1999 | Fletcher |

\* cited by examiner

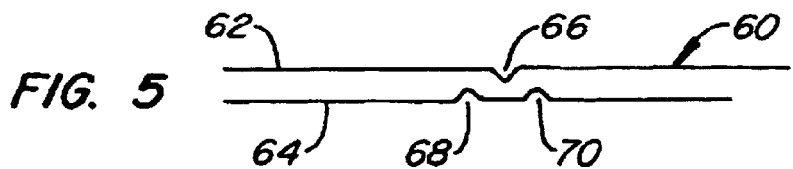
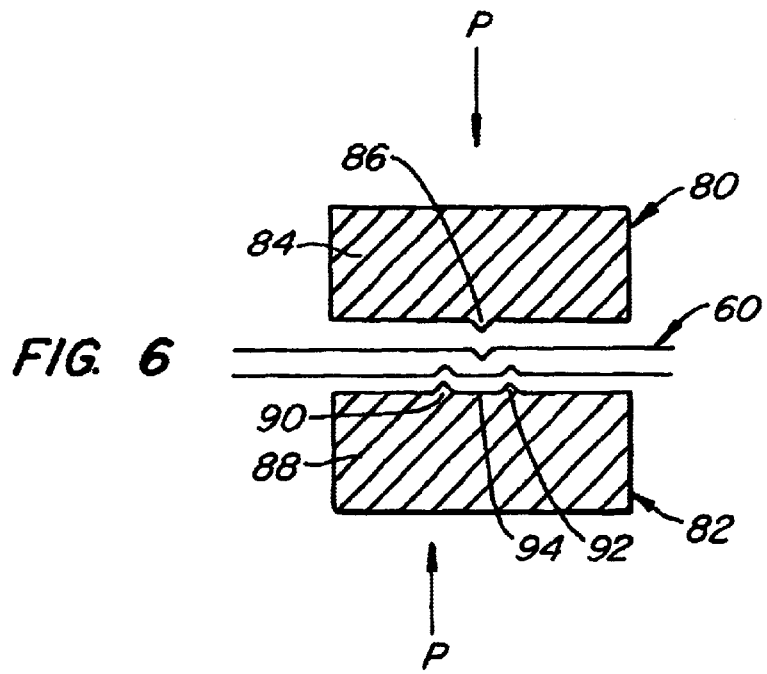
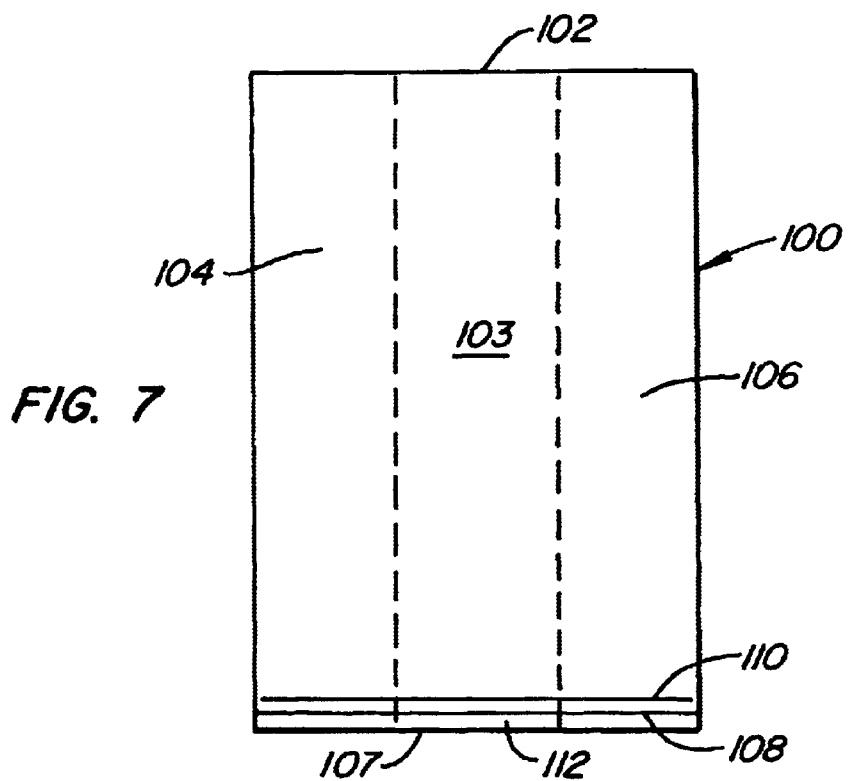

US 6,669,615 B2

PLASTIC FILM HINGING AND PRE-CREASING PROCESS

CROSS-REFERENCES TO RELATED APPLICATIONS

More specifically, this invention relates to a process of applying hinges and other related impressions to plastic bags and products so the products may be economically pre-folded, pre-creased or the like. This Patent Application is a Divisional of Ser. No. 09/267,345 filed Feb. 25, 1999, now abandoned which claims priority from Provisional Patent Application 60/088,613 filed Jun. 9, 1998 by the named inventor herein entitled Plastic Film Hinging.

This application claims priority from Provisional Patent Application 60/088,613 filed Jun. 9, 1998 by the named inventor herein entitled Plastic Film Hinging.

This application claims priority from Provisional Patent Application entitled Cold Sealing of Plastic Film 60/088,612 filed Jun. 9, 1998 by the named inventor herein. Patent application Ser. No. 09/257,848 filed Feb. 25, 1999 of even date herewith entitled Apparatus and Process for Cold Seal in Plastic Bags is likewise incorporated by reference as if fully set forth herein.

This application claims priority from Provisional Patent Application 60/089,582 filed Jun. 17, 1998 by the named inventor herein entitled Plastic Bag Bundling System. Patent application Ser. No. 09/258,010 filed Feb. 25, 1999 of even date herewith entitled Plastic Bag Bundling System is likewise incorporated by reference as if fully set forth herein.

This application claims priority from Provisional Patent Application 60/089,583 filed Jun. 17, 1998 by the named inventor herein with Don Pansier of Greenbay, Wis. entitled Automatic Ventilating System. Patent application Ser. No. 09/258,033 filed Feb. 25, 1999 of even date herewith entitled Automatic Ventilating System is likewise incorporated by reference as if fully set forth herein.

This application claims priority from Provisional Patent Application 60/092,232 filed Jul. 9, 1998 entitled Plastic Bag Manufacturing Process by the named inventor herein. Patent application Ser. No. 09/257,843 filed Feb. 25, 1999 of even date herewith entitled Plastic Bag Manufacturing Process is likewise incorporated by reference as if fully set forth herein.

Finally, this application claims priority from Provisional Patent Application 60/092,233 filed Jul. 9, 1998 entitled Plastic Film Rigidity Means by the named inventor herein. Patent application Ser. No. 09/258,015 filed Feb. 25, 1999 of even date herewith entitled Plastic Film Rigidity Means is likewise incorporated by reference as if fully set forth herein.

The above Provisional Applications and all following Regular Patent Applications filed of even date herewith—and all of them—are herein incorporated by reference as if fully set forth herein.

BACKGROUND OF THE INVENTION

This invention relates to plastic bag and film bag products that may be used for a multitude of purposes such as, but not limited to, fast foods, supermarkets, retail merchandise and point-of-purchase bags.

Common plastic bag styles used by retailers in fast food chains, supermarkets, and general merchandise, as well as in point-of-purchase applications, are typically of the bottom seal or sideweld variety. These bags are usually gusseted along their sides or along the bottom with the open bag mouth at the top. Many of these common bags have carrying handles, usually of the strap variety or die-cut holes. Typical plastic bags used in supermarket applications are about 0.0005 to 0.00065 in gauge; those used in retail merchandise bags are from 0.0005 to 0.0001; fast food bags are usually from 0.0007 to 0.00125, and; those used in point of purchase applications are typically from 0.001 to 0.004 mil thick. Retailers that desire to have a bag stand up on its own usually use square bottom paper bags instead of plastic bags due to their ability to stand up.

Common plastic bags when manually put into use usually follow a certain sequence. First, the user's fingers open the bag mouth. Second, the user at one hand grasps one side of the open mouth at the top. Third, the other hand grasps the opposing side of the bag mouth at the top. Fourth, the bag is pulled upward to capture air and billow open. Fifth, a hand is inserted in the bag to "find the bottom" as the bag is placed on the packing surface. Sixth, once the bottom is found, the hand is withdrawn, and; seventh, the user grasps the merchandise and begins loading the bag. Variations on this theme may include the shaking of bags to get them open and then the placement of a hand to find the bottom, or the insertion of a hand directly into the bottom to push the gussets down and out. Similar bag opening operations take place when paper bags are used.

Paper bags when opened are usually set upright and allow the user to place merchandise inside the bag at the bottom. On the other hand, most common plastic bags do not allow the bag to stand up without substantial difficulty. It would take a user several seconds to open up and put a common plastic bag in the right shape to make it stand up. It is impractical for a user in a high volume retail outlet to do this, as the cost of labor is substantial. This is one key reason most fast food restaurants still use paper bags.

Many attempts have been made to overcome the inability of plastic bags to stand up like paper bags. In a bottom seal bag variety, Hansen et al, U.S. Pat. Nos. 3,988,870 and 4,929,224, have created a square bottom bag by using a complex means of placing a mandrel inside the plastic tube which forms the bags. Others have accomplished this with a means of folding up the gussets after the bag has been made such as in Ross, U.S. Pat. No. 5,102,384 and Cole U.S. Pat. No. 3,886,850. Other approaches include the folding of bag bottoms as illustrated in Platz, U.S. Pat. No. 3,917,159, and angular heat seals as in LaFleur U.S. Pat. No. 3,915,077 and Brinkmeier, U.S. Pat. No. 3,896,709. Roen reveals a means of using angular seals in a sideweld bag in U.S. Pat. No. 4,717,262. As this disclosure points out, side weld bags are not satisfactory in the square bottom bag disclosure herein set forth.

With the exception of Roen, '262, all of these processes are relatively complex and require cumbersome processes of grasping, clamping, folding and/or heat sealing, most of which operations are conducted after the basic bag size and configuration has been cut and sealed from the plastic tube stock. Furthermore, the objective in all of the previously related patents reveals the means to fold or crease the bag material a specific, pre-determined direction, thereby creating a square bottom. The bag is not manufactured in a planar disposition and pre-configured so that upon first being opened it naturally squares out and forms a so-called square bottom.

In the high-speed bag manufacturing process used throughout the world, plastic bags are typically made from tube stock. This tube stock is cut and sealed—either bottom sealed or sidewelded—as the last step before being packed in a carton. These bags are conventional and do not have square bottoms.

Where square bottoms have been imparted to a bag after it has been formed, such imparting of square bottoms has been proven to be costly. Simply stated, to try to clamp and fold over and/or seal gussets together after a bag has already been cut and sealed from its tube stock is not economical. As illustrated in the above patents, Ross '384 and Platz '159, this bag forming requires a costly secondary operation after the bottom sealing process is completed and the bag has been cut free from the tube stock. These processes use a relatively sophisticated grasping and clamping to accomplish the folding process. For example in Hansen '224, the making of these square bottom bags requires placing a mandrel inside the tube prior to cutting and sealing. This too is unreliable and costly. Key reasons include the fact that tube widths vary greatly—a narrow tube will cause the mandrel to lock up inside the tube and then break the tube, a slightly wider tube will result in not having a properly formed bag. Second, this process requires narrow plastic tubes instead of the wider, more efficient ones used on 3–5 lanes machines and; three, the bag machine speeds are slow. These three factors would drive up the price of the bags making them impractical when compared to paper or other alternative technologies.

La Fleur, '077, reveals a means of angle sealing that is more cost effective than the three others listed above, but is still costly for bags made on modern, high-speed bag equipment that typically runs 3–5 lanes across and in speeds in excess of 125 cycles per minute. Trying to simultaneously control the heat sealing (or the folding, for that matter) of 12 to 24 side gussets pairs per cycle would result in either substantially reducing the machine's speed or it would have a highly unreliable outcome at best. It is important to note that this angle seal technology can produce uneven seals, which then results in irregular bag bottoms once they are opened and placed into use.

All of the above bag styles will cost substantially more to produce than common plastic bag styles, generally as much as 20–80% or more depending upon size. Only the Roen '262 bag product can produce an economically cost-effective bag but is limited to sideweld bag production and is not practical on smaller bags running 3–5 lanes across.

In what follows, we disclose a method that can be adapted to existing, modern high-speed bag making machinery and technology that can simultaneously produce bags 3–5 lanes across. At the same time, the disclosed method will not substantially reduce the manufacturing speed and produces a reliable quality product.

SUMMARY OF THE INVENTION

A hinge is disclosed for a plastic film. This film has a predetermined thickness sufficient for the plastic film to remain planar in an absence of a first bending moment applied across the plastic film. The hinge includes at least one linear groove configured in the plastic film to reduce the predetermined thickness of the plastic film at the linear groove. The hinge permits preferential hinging of the plastic film at the linear groove responsive to a bending moment at the linear groove across the plastic film less than the first bending moment. The linear groove has insufficient depth to sever the plastic film and enables the hinge film to retain sufficient remaining thickness at the linear groove to permit hinging and not tearing of the plastic film at the linear groove. When the hinge is placed across a plastic film, and the film bent at the hinge, the film defines a first panel and a second panel with each panel disposed at an angle to one another at the hinge. This allows the first panel and the second panel to form a three dimensional structure to maintain the plastic film of each panel against bending. A square bottom bag design is disclosed where the hinge predisposes a plastic bag to open with a square bottom.

The present invention relates to simple process of hinging plastic film that results in substantially the same effect of the creasing or folding or heat sealing of plastic film discussed in the Description of Prior Art. Unlike the Prior Art, the hinge may be impressed in plastic film at relatively high speed. In this embodiment, a linear die may impart the required groove to plastic film as it passes at relatively high speed (about 300 feet per second).

This process also is useful with plastic bag products. For example, the film can have a hinge precisely located at an angle to the direction of the passing film. The present invention reveals for the first time a means of hinging plastic film that can effect a unidirectional or bidirectional folding ability depending upon the desired effect. This hinging process may be applied to the plastic bag film before it is cut and sealed into a bag of predetermined length, which then does not significantly affect line speed. It is typically applied to the film in its layflat condition, which—unlike prior art—entirely eliminates the cumbersome, time consuming folding methodologies or the heat sealing processes previously discussed. Furthermore, this hinging process is easily adapted to existing high-speed bag making equipment and technology—both bottom seal and sideweld—and can be placed on multiple lanes without substantially affecting line speed. This hinging process can be applied to common plastic bags in a high-speed mode and ensures great accuracy to consistently produce high quality, square bottom plastic bags that stand up.

The present invention also reveals new possibilities in the use of this technology in the plastic bag and film industry. For instance, the hinging effect can be used to create new bag shapes and bottom configurations, such as flat or square bottom bags and bags with octagonal bottoms. With the hinges, the bottom portions of the side gussets on bottom seal bags will fold down upon themselves, forming a flat base. Or, hinges may be applied to the outside portions of the bottom gusset on sideweld bags which portions will then fold out upon themselves and form a flat base. The hinges can cause sideweld bags to stand more upright and erect with their sidewelded ends turning inward, which forms a squarer bag shape and improving the ability to load the bag. The hinging effect can also be used to cause bottom seals to fold under when desirable and can cause bags to stand up more erect. The hinging effect can used to make predetermined structural creases to give bags more vertical rigidity and may also be used to make bag closures in a pre-determined location. The hinging effect can even be done to impress an aesthetically appealing, registered embossing of a logo. The possibilities are many.

When applied to square-bottom or stand up bags, bottom seal or sideweld, the hinge preferentially enables the bag to open and dispose the square bottom to a counter surface. At least through the action of the hinges, the plastic bag is disposed to stand open and upright while in the empty state. The user can quickly find the bag bottom regardless of how he/she is opening and preparing the bag for use. Whether this preparation for use be by capturing air in a bag, shaking it, or by placing a hand inside the bag and pushing the gussets down at the bottom, the result is the same—a bag that squares out at the bottom and tends to stands up.

The hinge can also be reliably applied to laminated films and films that may be a blend of plastic and other materials such as foil or paper, for instance those used in point-of purchase displays. Many laminated films are made of a thin layer of foil with a plastic outer or inner layer. By applying the present invention to these types of films, the result is the same, a square bottom bag. Creating square or rectangular packages of this nature would result in a substantial savings of shipping costs and shelf space, as more square packages can be packed in a given carton size than round packages.

The hinging process is typically accomplished by applying pressure to a die upon a platen—or a die upon a matching, cooperating die—which in between lies one or more layers of plastic film. Using various combinations of dies, for instance male and female, male and male, two males and two females and so on, various effects may be created.

For ease of explanation, only some of the particular uses of the present invention will be revealed herein, however, it would be easy for anyone trained in the art to find other applications, which would fall under the scope of the present invention.

BRIEF DESCRIPTION OF THE DRAWINGS

FIG. 5 is a blown-up cross sectional view of the present invention in the form of a double bidirectional hinge as it is applied to a layer of plastic film.

FIG. 6 is a blown-up cross sectional view of the film in FIG. 5 as it lies between two sets of complementary dies that have made the double bidirectional hinge.

FIG. 7 is a plan view of a bag in which the unidirectional hinge described in FIGS. 1 and 2 has been applied at the bottom of a bag near its bottom seal.

DESCRIPTION OF THE SPECIFIC EMBODIMENTS

Figure 1:
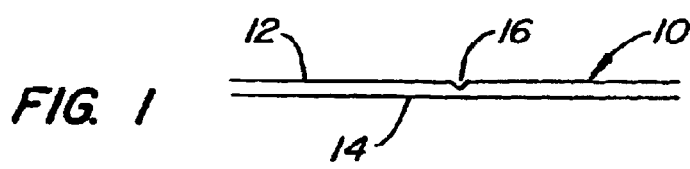
FIG. 1 is a blown-up cross sectional view of the present invention in the form of a single, unidirectional hinge as it has been applied to a layer of plastic film.

In FIG. 1 film 10 has a top surface 12 and a bottom surface 14. Impressed in top surface 12 of film 10 is crimp 16, which crimp forms a unidirectional hinge (also interchangeably referred to as hinge 16) in film 10. It is easy to see that film 10 will tend to want to fold only in one direction, which is up upon itself at hinge 16.

Figure 2:
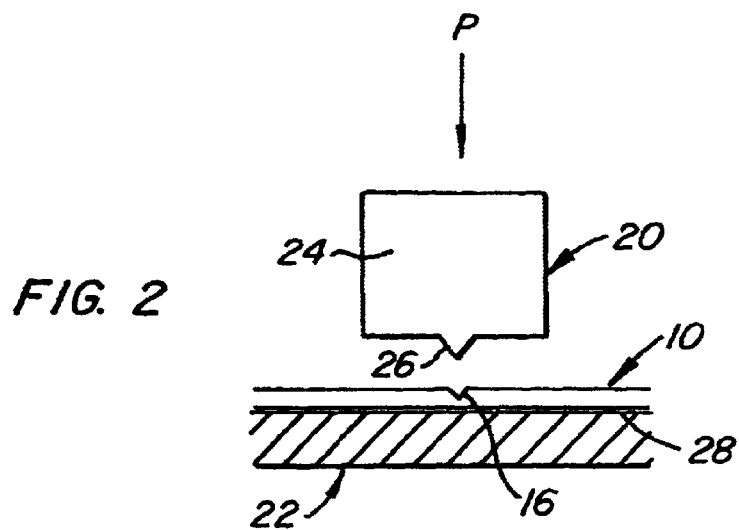
FIG. 2 is a blown-up cross sectional view of the film in FIG. 1 as it lies between a die and platen that has made the single unidirectional hinge.

In FIG. 2 film 10 is situated between die 20 and platen 22. Die 20 has a body 24 and a blunted male pointed edge 26 which points downward towards film 10. Platen 22 has a firm planar surface 28 (such as steel or plastic) to receive blunted male pointed edge 24 when pressure P is applied, thus creating crimp 16 in film 10.

Figure 3:
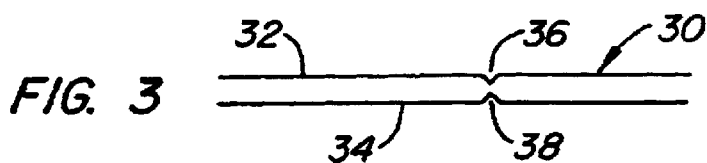
FIG. 3 is a blown-up cross sectional view of the present invention in the form of a bidirectional hinge as it is applied to a layer of plastic film.

In FIG. 3 film 30 has a top surface 32 and a bottom surface 34. Impressed in top surface 32 of film 30 is crimp 36 and impressed in bottom surface 34 is crimp 38. Together crimps 36 and 38 form a bidirectional hinge (which two crimps together are interchangeably referred to as hinge 36–38) in film 30. It is easy to see that film 30 will tend to want to fold in either direction, up or down at hinge 36–38.

Figure 4:
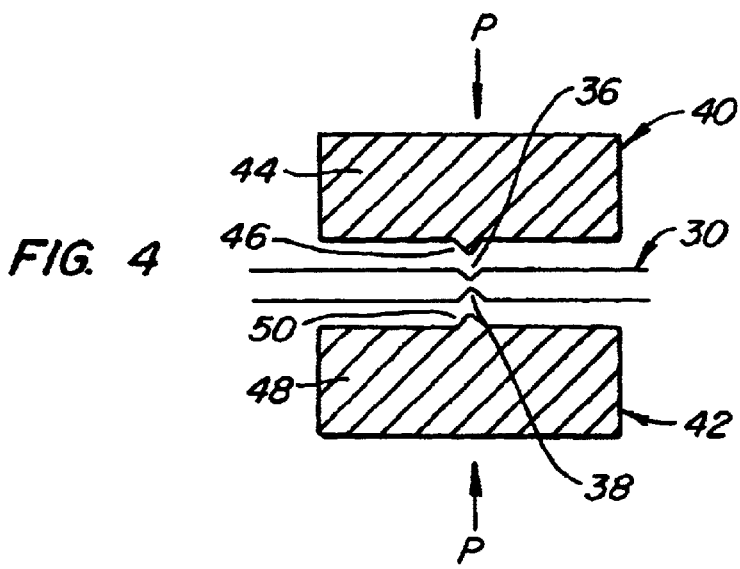
FIG. 4 is a blown-up cross sectional view of the film in FIG. 3 as it lies between two matching dies that have made the bidirectional hinge.

In FIG. 4 film 30 is situated between die 40 and matching die 42. Die 40 has a body 44 and a blunted male pointed edge 46 which points downward towards film 30. Die 42 has a body 48 and a blunted male pointed edge 50 that matches up to blunted male pointed edge 44 when pressure P is applied, thus creating crimps 36 and 38 in film 30.

In FIG. 5 film 60 has a top surface 62 and a bottom surface 64. Impressed in top surface 62 of film 60 is crimp 66 and impressed in bottom surface 64 are crimps 68 and 70. Together crimps 66, 68 and 70 form a double, bidirectional hinge (which three crimps together are interchangeably referred to as hinge 66–68–70) in film 60. It is easy to see that film 60 will tend to want to fold in either direction, up or down. This type of double bidirectional hinge may easily be simultaneously impressed upon multiple film layers and improves the bidirectional hinging qualities of plastic film. It may therefor be the preferred embodiment when the present invention is used as a hinge on multi-layer layflat tubing.

In FIG. 6 film 60 is situated between die 80 and matching die 82. Die 80 has a body 84 and a blunted male pointed edge 86 which points downward towards film 60. Die 82 has a body 88 and two blunted male-pointed edges 90 and 92 situated outside of valley 94. The blunted male pointed edge 86 is positioned atop valley 94, which edge and valley together with blunted edges 90 and 92 form a corresponding male/female relationship. Upon the application of pressure P, a double, bidirectional, valise-like hinge has thus been formed in film 60.

In FIG. 7, bag 100 has an openable bag mouth 102 at the top, a front wall, 103 and a rear wall (not shown), two opposing side gussets 104 and 106, a bottom 107 formed by lateral bottom seal 108 and just above bottom seal 108 at the bottom of front wall 103 and impressed upon all four bag plies is a lateral unidirectional hinge 110. Below bottom seal 108 is bag skirt 112.

Figure 8:
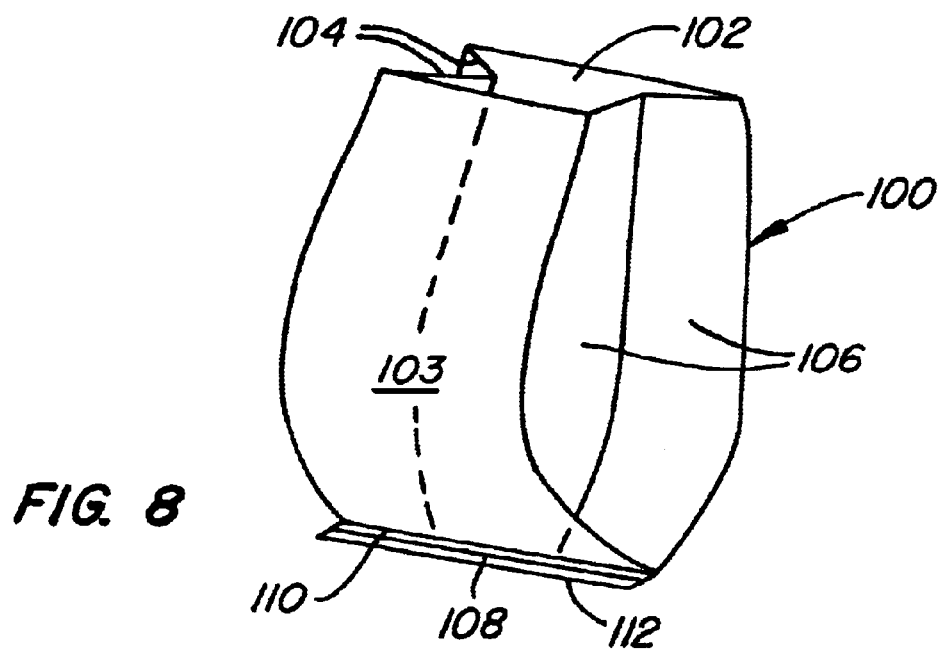
FIG. 8 is a perspective view of the bag in FIG. 7 as it is opened and illustrates how the bottom seal tucks neatly under due to the presence of the nearby unidirectional hinge.

In FIG. 8 bag 100 is opened at bag mouth 102 allowing side gussets 104 and 106 to openably expand. As bag 100 is opened, front wall 103 expands forwards, whereas unidirectional bag hinge 110 causes bottom seal 108 and bag skirt 112 to fold upwards, in one direction, upon front wall 103. The result is a bag bottom that will cooperate with a user's desire to make the bag square out and stand up; whereas traditional, unhinged bottom seals and bag skirts tend to fight the squaring out and standing up operation by pointing straight downward.

Figure 9:
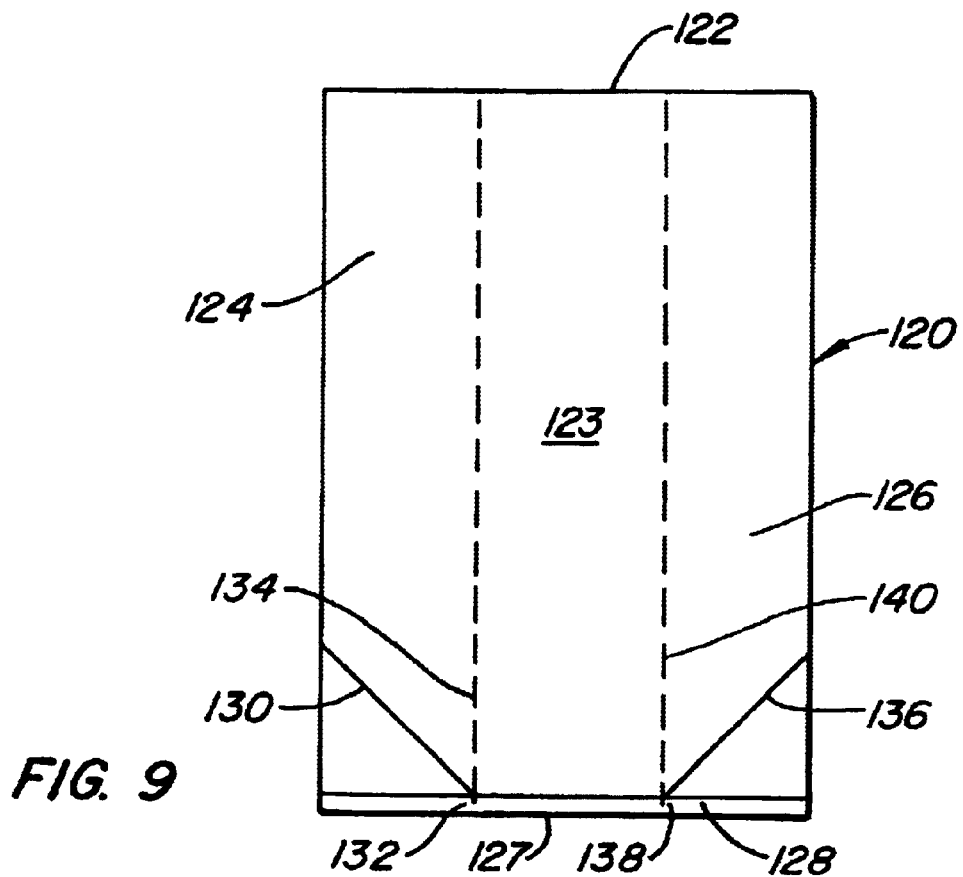
FIG. 9 is a plan view of a bag in which the bidirectional hinge of FIGS. 3 and 4 has been impressed upon the bottom portion of the two side gussets to create a set of angular bidirectional hinges, which will tend to fold upon opening.

In FIG. 9, bag 120 has an openable bag mouth 122 at the top, a front wall, 123 and a rear wall (not shown), two opposing side gussets 124 and 126, a bottom 127 formed by lateral bottom seal 128. At the base of gusset 124 is a single, bidirectional hinge 130 which begins approximately at point 132 where center gusset crease 134 meets the lateral bottom seal 128, and has been impressed upon both of the underlying gusset panels 142 and 144 (not shown) in gusset 124 and rear bag wall (not shown), at an approximate 45 degree angle, and; opposing hinge 130 at the base of gusset 126 is another single, bidirectional hinge 136, which begins approximately at point 138 where center gusset crease 140 meets the lateral bottom seal 128, and has been impressed upon both of the underlying gusset panels 146 and 148 (not shown) in gusset 126 and rear bag wall (not shown), at an approximate 45 degree angle.

Figure 10:
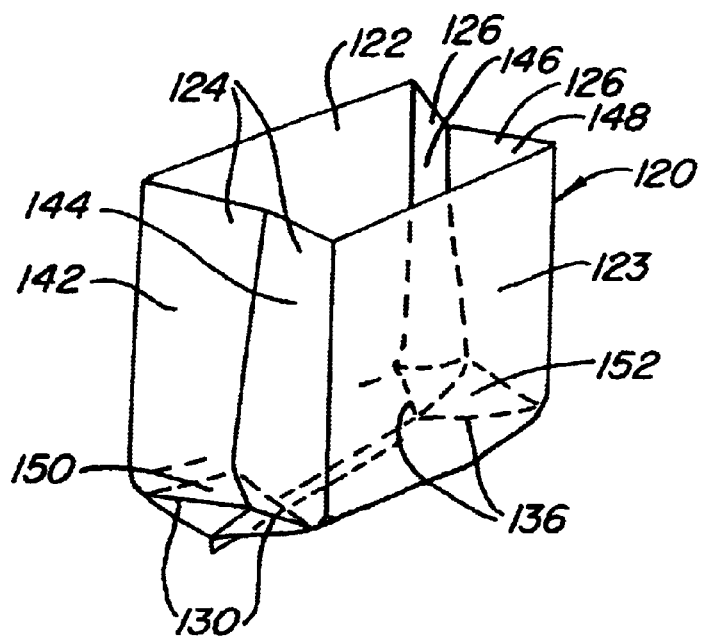
FIG. 10 is a perspective view of the bag in FIG. 9 as it is opened and illustrates how the bottom tends to naturally square out.

In FIG. 10 bag 120 is opened at bag mouth 122 allowing side gussets 124 and 126 to openably expand. As bag 120 is opened, front wall 123 expands forward, whereas bidirectional bag hinge 130 enables the gusset panels 142 and 144 of side gusset 124 to fold down and out upon themselves, while simultaneously; bidirectional bag hinge 136 (dotted lines) enables the gusset panels 146 and 148 of side gusset 126 to fold down and out upon themselves, thereby and together hinges 130 and 136 cause the tendency of the lower and outer gusset regions 150 and 152 of bag 120 to symmetrically square out. The reason why hinges 130 and 136 and their corresponding gusset panels 142 and 144 and 148 and 150 respectively tend to fold down and out and upon themselves is because when a user opens the bag the incoming air causes the bag walls to billow outwards in which the least resistance is at hinges 130 and 136; thus the adjacent panels 142 and 144 and 148 and 150 respectively tend to fold down and out upon themselves. Similarly this can be accomplished by the user simply placing a hand inside the bag and pushing downward to "find the bottom".

Stopping at the embodiment of FIG. 10, some attention can be given to the reasons why bag 120 stays open and stationary in the "squared out" disposition illustrated. Taking the case of a plain sheet of paper, the reader will realize that upon placing a single fold in a sheet of paper, a rigid quality is imparted across the hinge that was not possessed by the single sheet of paper. In short, each folded panel of the paper reinforces the remaining folded panel of paper across the hinge. This is in accordance with the well known art of Origami.

In the case here, this principle of reinforcement is applied to plastic panels. When folding of a plastic panel is present, each plastic film panel imparts stiffness across the hinge. As it is extremely unusual to apply this principle to film membranes as flexible as those used in plastic bags, I have under taken to test this phenomena.

Figure 11:
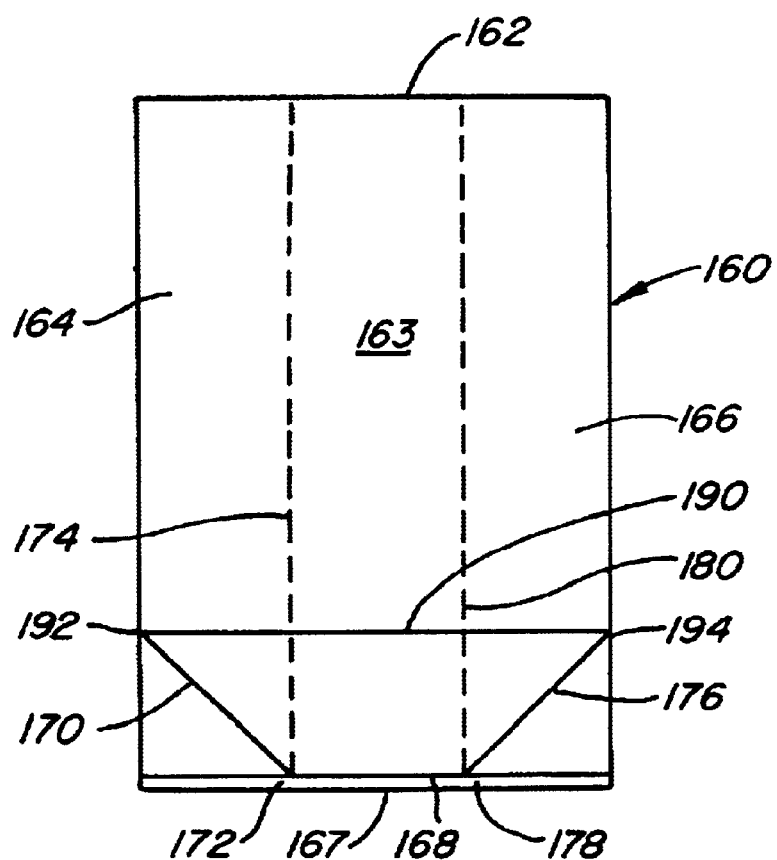
FIG. 11 is a plan view of a bag in which the double bidirectional hinge of FIGS. 5 and 6 has been impressed upon the bottom portion of the two side gussets to create a set of angular bidirectional hinges and a third double, lateral bidirectional hinge is impressed through the bag's front wall, rear wall and its two outer gussets that further defines the bag bottom, all of which hinges tend to fold and maintain the square bottom bag open.

In FIG. 11, bag 160 has an openable bag mouth 162 at the top, a front wall, 163 and a rear wall (not shown), two opposing side gussets 164 and 166, a bottom 167 formed by lateral bottom seal 168. At the base of gusset 164 is a double, bidirectional hinge 170 which begins approximately at point 172 where center gusset crease 174 meets the lateral bottom seal 168, and has been impressed upon both of the underlying gusset panels 182 and 184 (not shown) in gusset 164 and rear bag wall (not shown), at an approximate 45 degree angle, and; opposing double hinge 170 at the base of gusset 166 is another double, bidirectional hinge 176, which begins approximately at point 178 where center gusset crease 180 meets the lateral bottom seal 168, and has been impressed upon both of the underlying gusset panels 186 and 188 (not shown) in gusset 166 and rear bag wall (not shown), at an approximate 45 degree angle. Another double, bidirectional hinge 190 is impressed laterally across front panel 163, the rear panel (not shown), through both side gussets 164 and 166 and their gusset panels 182 and 184 and 186 and 188 respectively (not shown), which lateral hinge begins at the approximate top, outside end 192 of hinge 170 and terminates at the approximate top outside end 194 of hinge 176. For added clarification, the impressing of bidirectional hinges 170, 176 and 190 across all plies of plastic film in bag 160 may be accomplished by lying all four film plies in between matching dies, such as those illustrated in FIG. 6 or other suitable, similar means.

Figure 12:
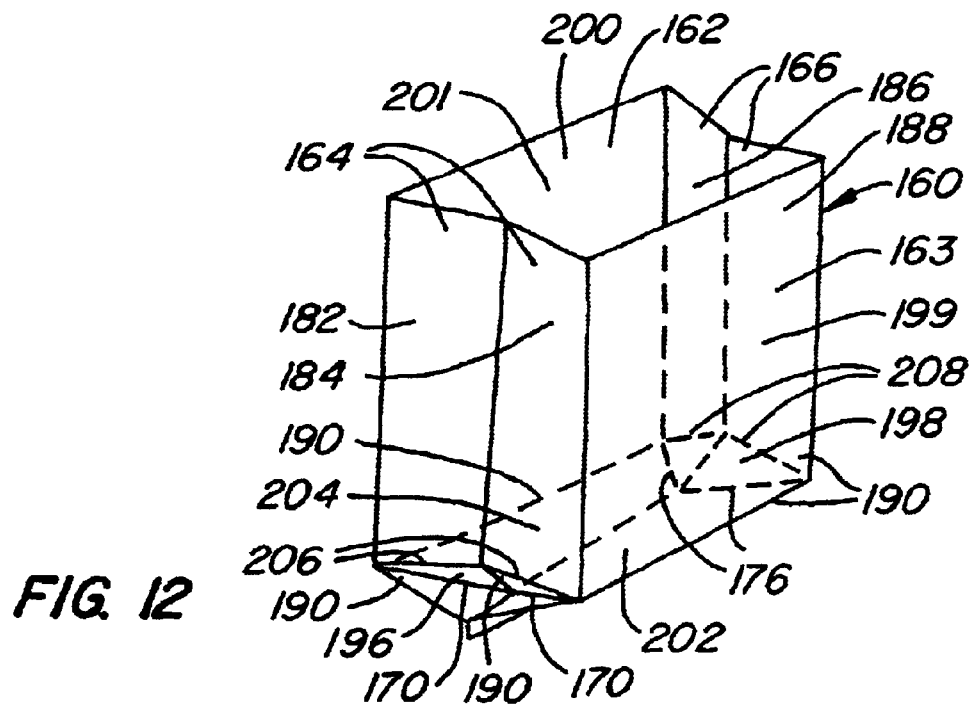
FIG. 12 is a perspective view of the bag in FIG. 11 as it is opened and illustrates how the bag bottom tends to naturally take on a rectangular shape.

In FIG. 12 bag 160 is opened at bag mouth 162 allowing side gussets 164 and 166 to openably expand. As bag 160 is opened, front wall 163 expands forward, whereas bidirectional bag hinge 170 enables the gusset panels 182 and 184 of side gusset 164 to fold down and out upon themselves, while simultaneously, bidirectional bag hinge 176 (dotted lines) enables the gusset panels 186 and 188 of side gusset 166 to fold down and out upon themselves, thereby and together hinges 170 and 176 cause the tendency of the lower and outer gusset regions 196 and 198 of bag 160 to symmetrically square out to form a flat bottom. To enhance the ability of the bottom region of bag 160 to square out and subsequently stand up, lateral bidirectional hinge 190 cooperates with the two gusset hinges 170 and 176 when bag 160 is opened. As explained in detail in FIG. 10, the incoming air causes the bag walls to billow outwards and causes hinges 170 and 176 to fold down and out and upon themselves (as explained in detail in FIG. 10), and likewise the lateral hinge 190 enables the upper portion 199 (above hinge 190) of front wall 163 and the upper portion 201 (above hinge 190) of the rear wall 200 to tend to set upright, with the lower portion 202 (below hinge 190) of front wall 163 and the lower portion 204 (below hinge 190) of rear wall 200 tending to neatly fold under, thus creating a rectangular, flat bottom region and a bag that tends to want to stand up. Furthermore, the billowing air entering bag 160 causes the bidirectional hinge 190 at gusset locations 206 and 208 to bend down and out to complete the rectangular, flat bottom configuration and further enabling the bag to stand up.

Figure 13:
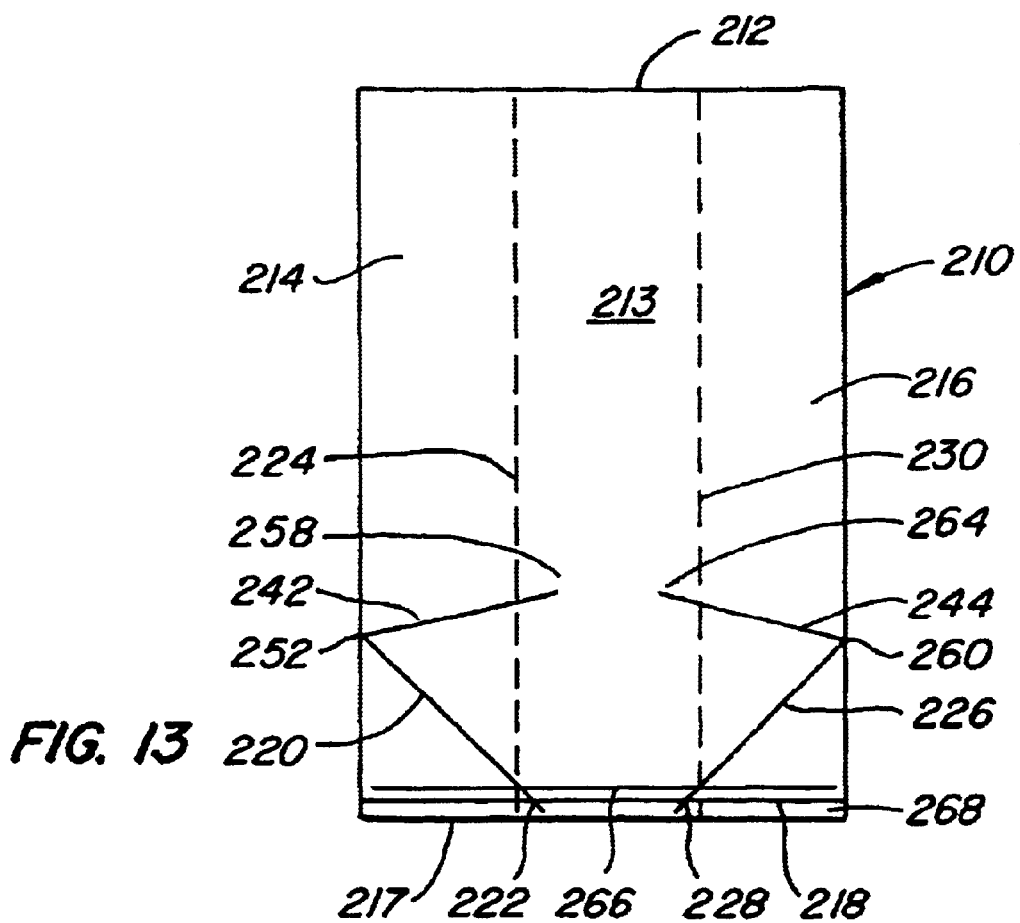
FIG. 13 a plan view of the preferred version of a stand-up bag in which the double bidirectional hinge of FIGS. 5 and 6 has been impressed upon the bottom portion of the two side gussets to create a set of angular bidirectional hinges and a second set of double lateral bidirectional hinges are impressed through the bag's front wall, rear wall and its two outer gussets further defining the bag's bottom, and the unidirectional hinge of FIGS. 1 and 2 are applied near the bottom seal, all of which will tend to fold upon the opening of the bag.

In FIG. 13, the preferred version the present invention in bag-form is bag 210, which has an openable bag mouth 212 at the top, a front wall, 213 and a rear wall (not shown), two opposing side gussets 214 and 216, and a bottom 217 formed by lateral bottom seal 218. At the base of gusset 214 is a double, bidirectional hinge 220 which begins approximately at point 222 just inside where center gusset crease 224 meets the lateral bottom seal 218, and has been impressed upon both of the underlying gusset panels 232 and 234 (see FIG. 14) in gusset 214 and rear bag wall (not shown), at an approximate 45 degree angle, and; opposing double hinge 220 at the base of gusset 216 is another double, bidirectional hinge 226, which begins approximately at point 228 just inside where center gusset crease 230 meets the lateral bottom seal 218, and has been impressed upon both of the underlying gusset panels 236 and 238 (see FIG. 14) in gusset 216 and rear bag wall (not shown), at an approximate 45 degree angle. Another set of double, bidirectional hinges 242 and 244 are impressed laterally across the outer portions of front panel 213, the rear panel (not shown), and through both side gussets 214 and 216 respectively and their gusset panels 232 and 234 and 236 and 238 respectively (FIG. 14); of which lateral hinge 242 begins at the approximate top, outside end 252 of hinge 220 and extends inwardly at a 15 degree angle and terminates after passing across the center crease 224 in gusset 214 at point 258 which is approximately 1" inside center crease 256, and; lateral hinge 244 begins at the approximate top, outside end 260 of hinge 226 and extends inwardly at a 15 degree angle and terminates after passing across the center crease 230 in gusset 216 at point 264 which is approximately 1" inside center crease 230. Lateral bidirectional hinges 242 and 244 being impressed at the 15 degree angle enable the bag to open up and square out easier than the single hinge illustrated in FIGS. 11 and 12 due to providing a "path of least resistance" which enables the outside gussets 214 and 216 to more easily billow outwards and open. Just above bottom seal 218 at the bottom of front wall 213, lies a lateral, single unidirectional hinge 266, which is impressed upon all four bag plies, much like that illustrated in FIG. 7. Below bottom seal 218 is bag skirt 268. It should be appreciated that all of the hinges in bag 210 may be made in one single operation by impressing dies upon all 4 plies in the layflat tubing, and can be done at virtually full line speed, simultaneously on 3–5 lanes across. Furthermore, this operation may be accomplished either before or after the bags have been cut and the bottoms sealed. Doing this single operation at virtually full line speed with existing labor crews and before bag 260 enters the final cutting and sealing operation eliminates the need for an extra manufacturing step that would typically require additional handling and labor.

Figure 14:
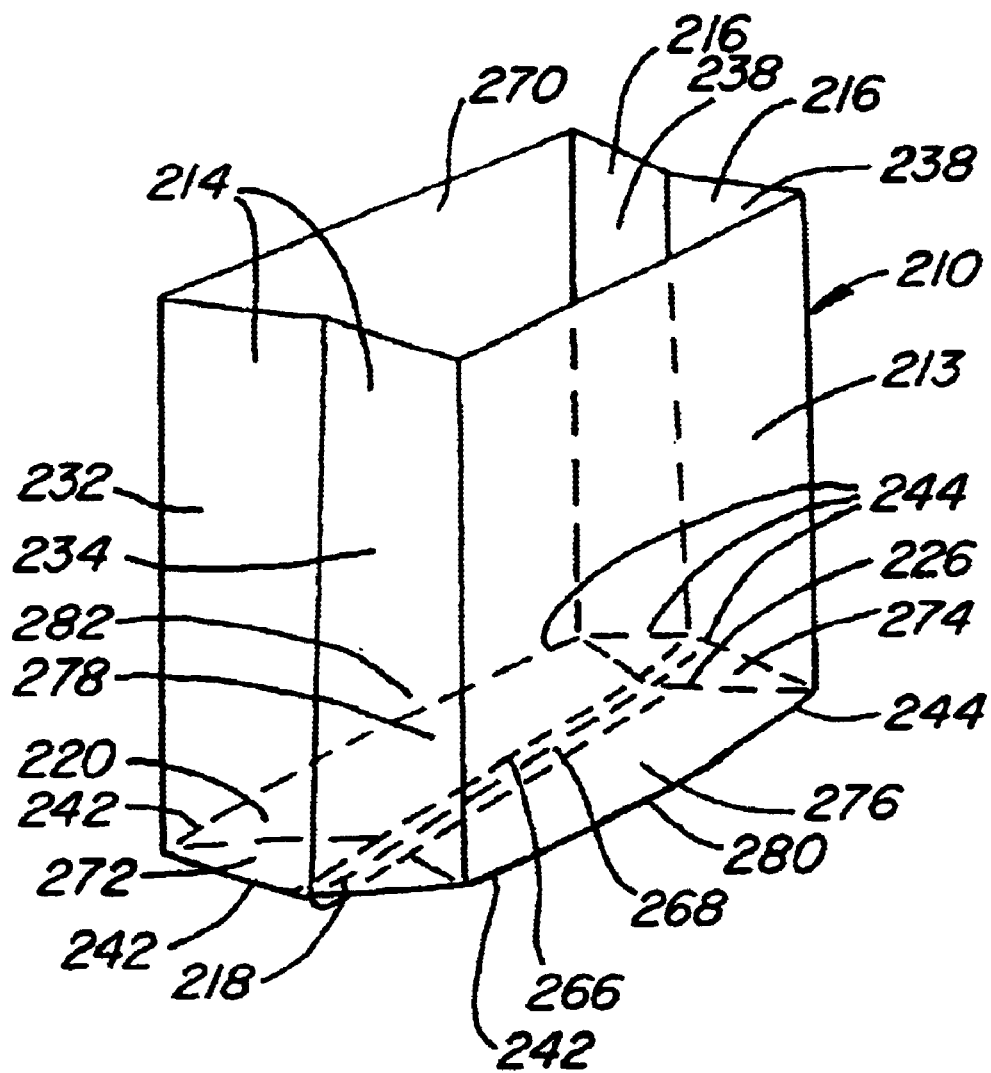
FIG. 14 is a perspective view of the bag in FIG. 13 as it is opened and illustrates how the bag tends to naturally square out and stand-up with the bottom seal neatly tucked underneath.

In FIG. 14 bag 210 is fully opened, squared out and standing fully upright. It has been opened much like that of bag 160 as shown in FIGS. 12 and 13. However, the preferred attributes of bag 210 enable it to more readily cooperates with a user's squaring out and standing up operation. As illustrated, bag 210 is fully open at bag mouth 212, in which side gussets 214 and 216 and front wall 213 and rear wall 270 are fully expanded outward. Bidirectional bag hinges 220 and 226 are completed folded down and out upon themselves. The two lateral bidirectional hinges 242 and 244 have fully cooperated with the two gusset hinges 220 and 226 and have neatly created the lower and outer gusset regions 272 and 274, which have symmetrically squared out. By using these two, slightly angled, bidirectional hinges, bag front wall 213 and rear wall 270 have an improved structural rigidity, thereby allowing it to stand up better. It can be noted that the newly defined bottom, which consists of outer gusset regions 272 and 274 plus lower front panel region 276 and rear panel region 278, has also created a more stable base upon which to sit. As illustrated this base has a slightly octagonal (or decagonal) shape. Unidirectional hinge 266 has also caused the bottom seal 218 and skirt 268 to neatly fold under the bag's bottom and not conflict with the squaring out effect. At the breaks 280 and 282 located in between the two sets of 15 degree lateral, bidirectional hinges, the front and rear bag walls are allowed to naturally adjust to the squaring out effect at the bottom and likewise in creation of the slightly octagonal (or decagonal) shape, improve the ability of the front wall 213 and rear wall 270 to stand upright and not collapse inward.

Figure 15:
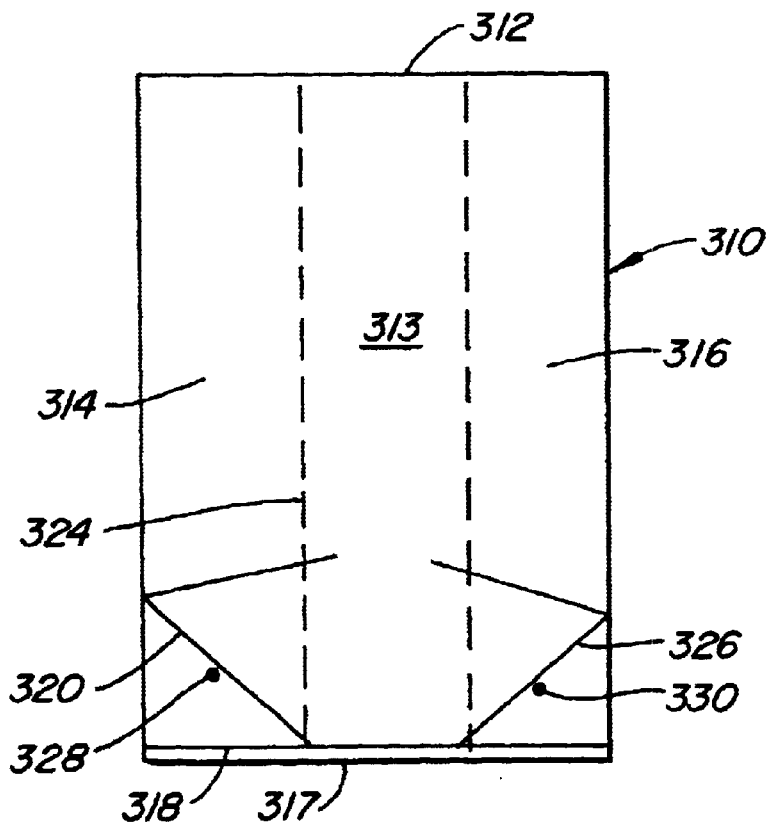
FIG. 15 is a plan view of a variation on the bags in FIGS. 9 through 14 in which a heated seal is applied inside the angular hinges to improve the folding tendency.

In FIG. 15 bag 310, has an openable bag mouth 312 at the top, a front wall, 313 and a rear wall (not shown), two opposing side gussets 314 and 316, and a bottom 317 formed by lateral bottom seal 318. At the base of gusset 314 and 316 are double, at bidirectional hinges 320 and 326 respectively, which are like those explained in detail in FIGS. 13 and 14 and lateral bidirectional hinges 332 and 334 also explained in detail in FIGS. 13 and 14. Below hinge 320 is heat sealed point 328 and below hinge 326 is heat sealed point 330, each heat sealed point 328 and 330 bonding the front bag wall to the front inside gusset panels (not shown) of side gussets 314 and 316 respectively. Directly behind these heat sealed points are two additional heat-sealed points (not shown) that bond the rear bag wall to the rear inside gusset panels (not shown). These heat-sealed points bond the respective bag walls and gusset panels together while the air enters the bag, billows it out and folds at the angular hinges 320 and 326. This bag 310 is opened and put into use much like the bags in FIGS. 9 through 14 and squares out and stands up in much the same manner.

Figure 16:
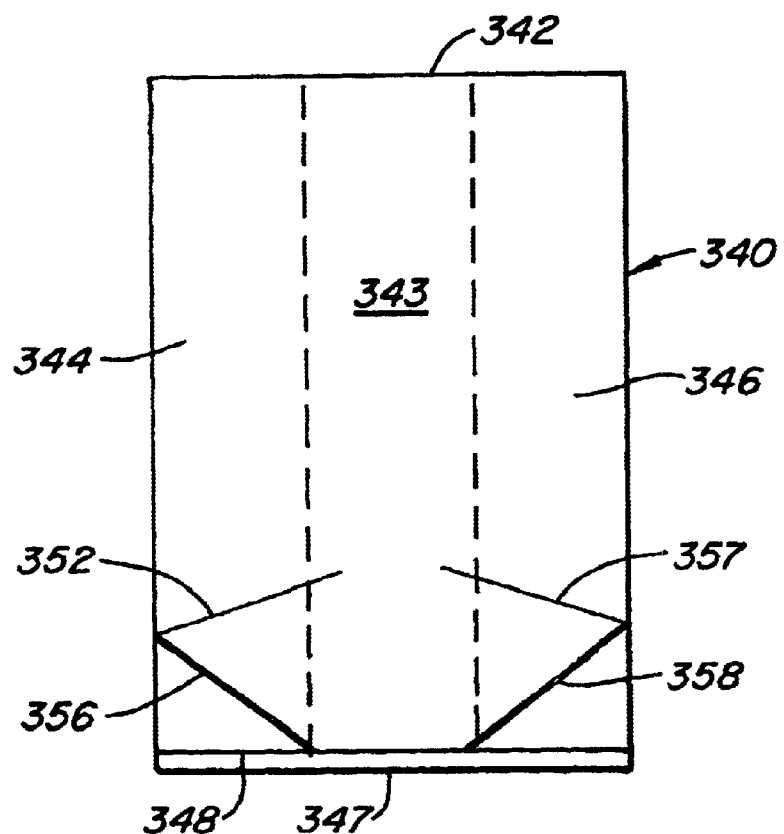
FIG. 16 is another plan view of a variation of the bag in FIGS. 13 and 14 in which angular heat seals through the side gusset panels are used instead of the double bidirectional hinges that create the pre-determined angular fold locations.

In FIG. 16 bag 340, has an openable bag mouth 342 at the top, a front wall, 343 and a rear wall (not shown), two opposing side gussets 344 and 346, and a bottom 347 formed by lateral bottom seal 348. Toward the base of gusset 344 and 346 are double, lateral bidirectional hinges 352 and 354, which lie at 15% angles as explained in detail in FIGS. 13 and 14. Below lateral hinges 352 is angular heat seal 356 and below lateral hinge 354 is angular heat seal 358, which angular seals are located in much the same 45 degree angle as the bidirectional angular hinges described in FIGS. 9 through 14. Each angular heat seal 356 and 358 bonds the front bag wall to the front inside gusset panels (not shown)

of gussets 344 and 346 respectively. Directly behind these angular heat seals are two additional angular heat seals (not shown) that bond the rear bag wall to the rear inside gusset panels (not shown). These angular heat seals maintain the bag wall together while the air enters upon opening and tends to form a fold location much like the angular hinges described in the previous FIGS. 9 through 14. This bag 340 is opened and put into use much like the bags in FIGS. 9 through 14 and squares out and stands up in a similar manner.

Figure 17:
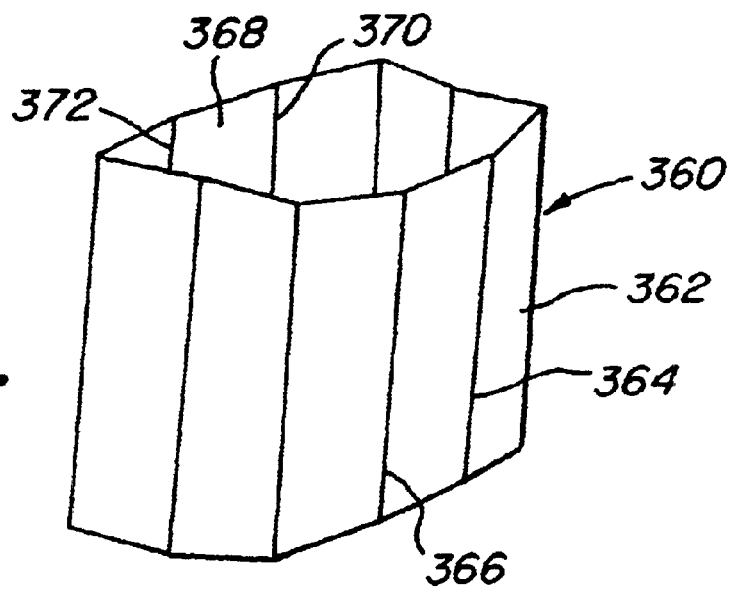
FIG. 17 is perspective view of the bag in FIGS. 13 and 14, which illustrates the use of a unidirectional hinge that forms structural creases and instead of folding, the creases give structural rigidity to the front and rear walls of a bag.

In FIG. 17 bag 360 is fully opened, squared out and standing fully upright much like the bag in FIG. 14. However, in front wall 362 there are two vertical unidirectional hinges 364 and 366 and in rear wall 368 there are also two vertical unidirectional hinges 370 and 372. The four vertical hinges 364, 366, 370 and 372 serve to stiffen their respective bag walls since the hinges run in a direction opposite that which tends to fold. This effect is similar to putting a common ordinary piano hinge on end. While it may fold inward or outward, it would resist folding or bending horizontally. The result is a plastic bag that tends to stand up better, longer.

Figure 18:
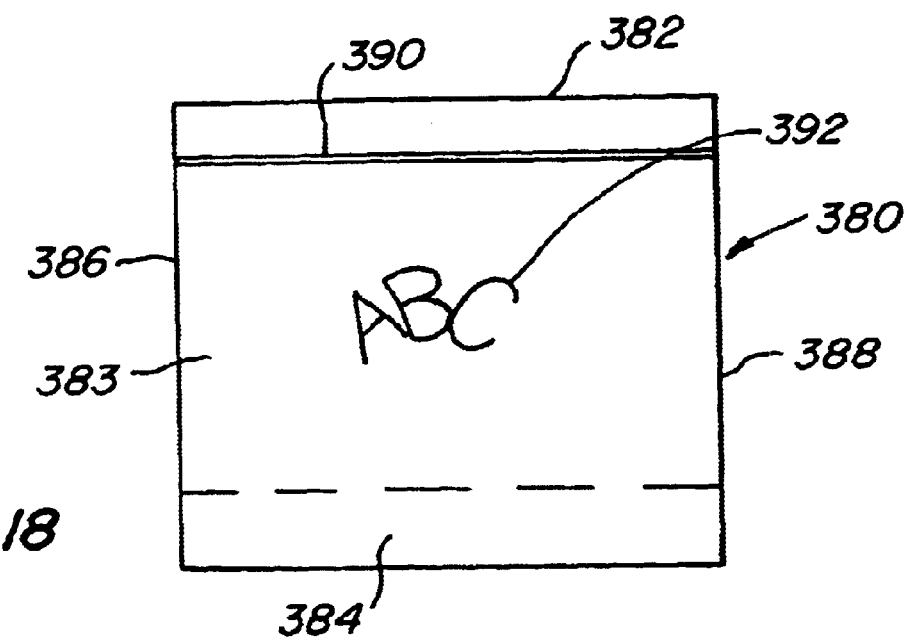
FIG. 18 is a plan view of a bag in which the double bidirectional hinge of FIGS. 5 and 6 has been applied near the upper region to create a valise-like closure near the bag mouth and a bidirectional hinge centrally located to create an embossed logo.

In FIG. 18, sideweld bag 380 has an openable bag mouth 382 at the top, a front wall, 383 and a rear wall (not shown), a single bottom gusset 384 and two side seals 386 and 388. About 1" down from the top of bag 380 is a spaced, lateral, double unidirectional hinge 390. Centrally impressed in front bag wall 383 and the rear bag wall (not shown) is bidirectional hinge 392 that forms a decorative logo, titled, "ABC".

Figure 19:
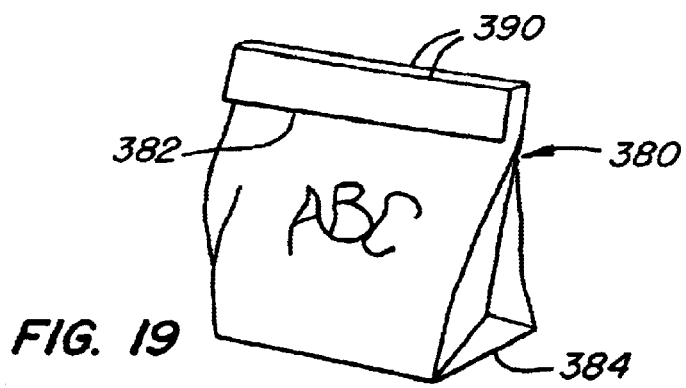
FIG. 19 is a perspective view of the bag in FIG. 11, in which the valise-like closure is folded over, closing off the bag mouth.

In FIG. 19, sideweld bag 380 is shown loaded with goods (not shown) that have been placed inside the bag, atop bottom gusset 384. Bag mouth 382 now points downward as bag 380 has been closed across the top at the spaced, lateral, double unidirectional hinge 390. This "valise-like" closure may provide short-term preservation of foods.

Figure 20:
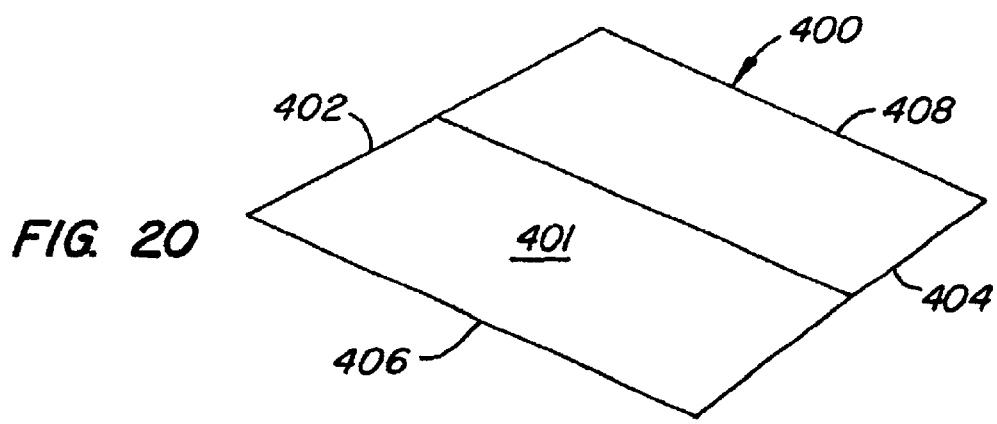
FIG. 20 is a perspective view of a single ply plastic sheet cut in a predetermined length with a bidirectional hinge enabling a user to quickly fold it over when put into use.

In FIG. 20 plastic sheet 400 has a top surface 401, a top edge 402, a bottom edge 404, two side edges 406 and 408 and impressed upon top surface 401, lying parallel to the two side edges 406 and 408 at a central location, is bidirectional hinge 410. It is easy to see that a user may quickly fold plastic sheet 380 over merchandise at the fold line created by bidirectional hinge 410.

Figure 21:
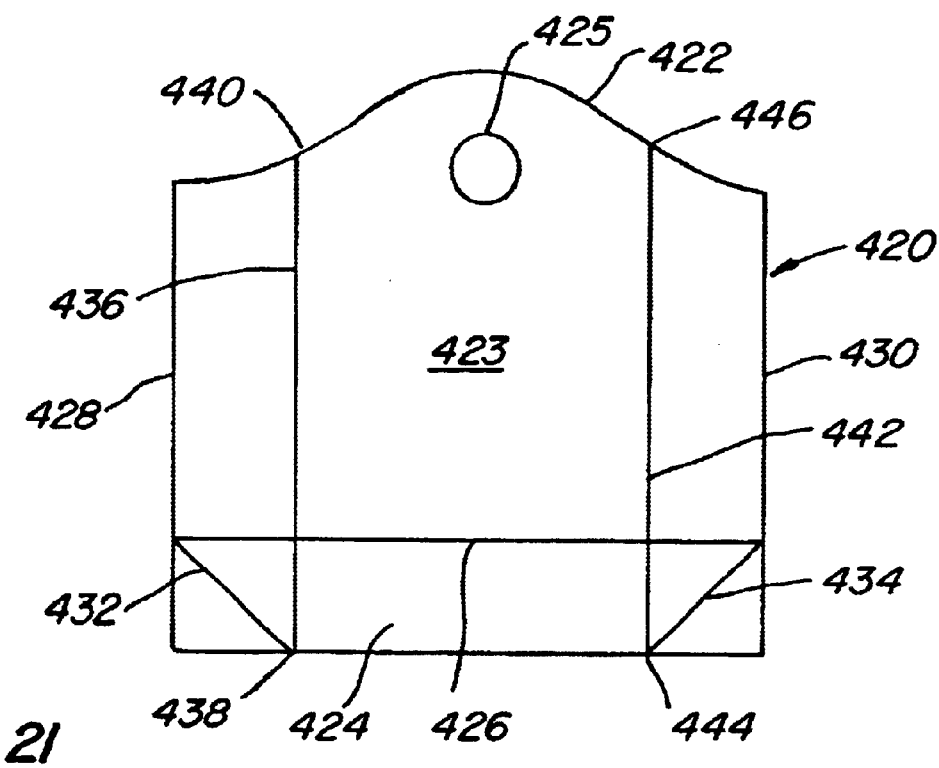
FIG. 21 is a plan view of a sideweld bag with a bottom gusset in which bidirectional hinges have been applied.

In FIG. 21 sideweld bag 420 has a top 422, a front panel 423, a rear panel (not shown), a die cut handle 425, a bottom gusset 424 and its center gusset crease 426, and sidewelded edges 428 and 430. At 45 degree angles in both outer regions of bottom gusset 424 are bidirectional hinges 432 and 434 which respectively terminate approximately at the point where center crease 426 crosses sideweld 428 and where center crease 426 crosses sideweld 430. A vertical bidirectional hinge 436 begins at point 438 and terminates at point 440 and another bidirectional hinge 442 begins at point 444 and ends at point 446, both of which hinges have been impressed upon front wall 423, rear bag wall (not shown) and bottom gusset 424.

Figure 22:
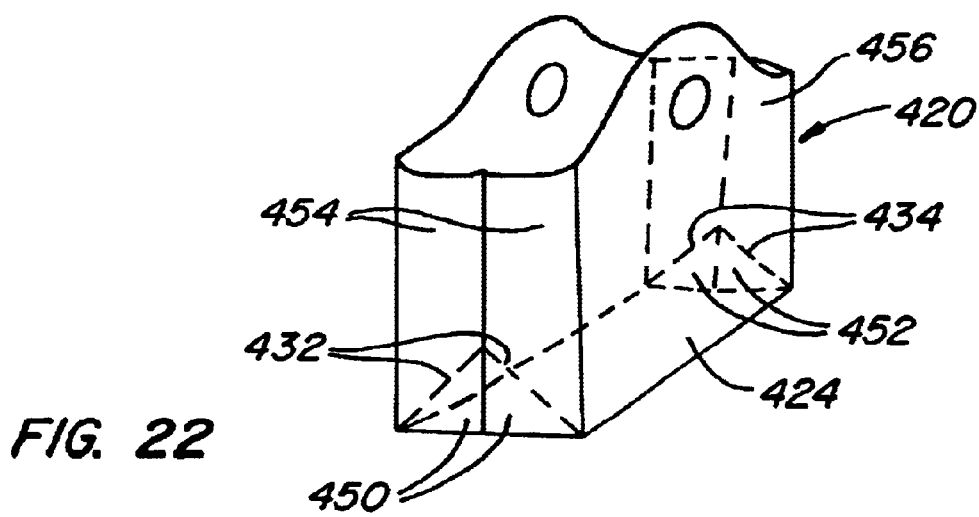
FIG. 22 is a perspective view of the bag in FIG. 21. which illustrates the bags square bottom and how it stands up.

In FIG. 22 the sideweld bag 420 of FIG. 21 has been opened and sets upright upon bottom gusset 424 as bidirectional hinges 432 and 434 cause the lower outer regions 450 and 452 respectively to turn upright and help square out bottom gusset 424 assisting in the formation of a flat base. In turn, bidirectional hinge 436 causes the upper outer region 454 to stand up and box out and sideweld 428 to cooperate by turning inward, while hinge 442 causes its respective upper outer region 456 to stand up and box out and sideweld 430 to cooperate by turning inward. Bag 420 is now ready to be loaded. It is easy to see that hinging the bottom gusset in sideweld bags has a similar outcome as hinging the side gussets in the bottom seal bags previously described. It is also important to note that the opening and use of this sideweld bag by a user is much the same as in the aforementioned bottom seal bag varieties.

Figure 23:
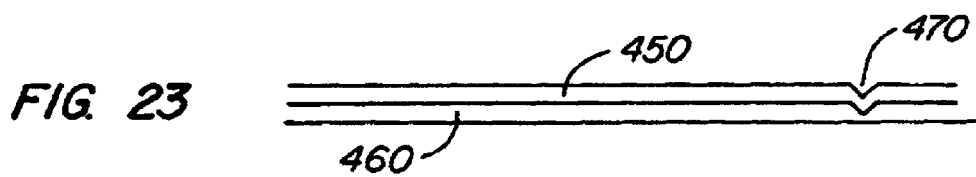
FIG. 23 is a side elevation view of a laminate layer of plastic and aluminum with a hinge impressed in the plastic portion of the laminate.

I have described this hinge invention as applying to laminates. In FIG. 23 I illustrate a laminate plastic film (plastic 450 and aluminum 460) which has a hinge 470 impressed upon it. The reader will understand that the hinge is impressed in the plastic portion of the laminate and that relative to the plastic portion, the laminated metallic (aluminum) portion is relatively not compressible.

From the foregoing descriptions of the process and the many applications of using hinges in plastic film, both bidirectional and unidirectional and as a structural member, it will be appreciated that the number of new applications of the present invention are many. It is not the intention of the present invention to be limited solely to the film products illustrated herein, but to be used in whatever conceivable manner to improve the performance of a plastic bag, sheet, film, laminated film, or blended film product. For instance, any of the products described herein may be enhanced by the use of laminated films that may receive hinge impressions better and may retain the impression longer.

It is also not the intention of confining the use of angular hinging to only bottom seal bags with side gussets. The phenomena works effectively on sideweld bags with bottom gussets when impressing the hinges upon the outer regions of the bag (as illustrated in greater detail my co-pending Provisional Patent Application entitled Cold Sealing of Plastic Film 60/088,612 filed Jun. 9, 1998, by the named inventor herein now Patent application Ser. No. 09/257,848 filed Feb. 25, 1999 of even date herewith entitled Apparatus and Process for Cold Seal in Plastic Bags). When applying hinges to sideweld bags such as in Roen '565, the outcome is substantially the same—a bag that wants to square and tends to stand up. Hinging also works well on side seal and lap seal bags and pouches, many of which are made of various co-extruded laminates. It is also not the intention of restricting the use of hinged film and bag products to retail outlets, point of purchase containers or industrial/commercial applications defined herein. The resultant bags made from this hinge/impression technology can be used for popcorn, sugar and flour, cookies, cat litter, dog food, road salt, bulk packaging of lettuce, vegetables and much, much more—most obviously whenever a square bottom bag or a predetermined fold location is desirable. This hinge/impressing technology can even be used as a means of improving the aesthetics of a package. For instance, decorative ribbing, or cross-hatching, logo embossing and so on.

It should also be understood that the means of impressing hinges in plastic products may be accomplished in other manners. For instance, rollers that are pointed at their roller ends could be run across plastic film to create hinges, or the pointed ends could fit into a female groove, which would create substantially the same effect. The intention of this application is not to limit the means of producing hinges, but is to show that any type of means (pressure or otherwise), properly applied, can indeed effect a hinge-type condition on a bag.

Furthermore, while the present invention refers to hinging of plastic film, it should be understood that the same phenomena occurs with any form of creasing, crimping or pre-weakening of film, and the inventor considers all of these phenomena to be essentially the same, producing essentially the same function, or producing essentially the same outcome.

I have referred to the reduction of the thickness of the plastic film along the linear axis to produce the hinge. Such a thickness reduction can constitute a little as 5% and could extend to 70% dependent upon the strength of the film utilized. An intermediate range of film reduction can be 10% to 50%. A narrow and preferred range is material dependent but for example can be in the range of 20% to 30% for a high density blend of plastic film.

The reader will also understand that at FIG. 23 I have added a depiction of a laminate. This same representation could also represent the so-called co-extruded material.

Additionally, and in describing the preferred bag of this invention, hinges are shown at 45°. These can vary and are described in the appended claims as "oblique." They can range from 30° to 60°. Further, the same bag can have oblique hinges of differing angularity.

What is claimed is:

1. A process of hinging at least two layers of plastic film material together in a high speed plastic bag line comprising the steps of:
    sequentially forming plastic bags, each plastic bag including
        a front panel of plastic film having two substantially parallel side edges;
        a rear panel of plastic film having two substantially parallel side edges;
        a fastening of the front panel and rear panel for forming a continuous periphery to the bag; and,
        a bottom joining a bottom of the front panel, and a bottom of the rear panel at substantial right angles to the side edges of the front panel and rear panel;
        whereby the bag has a closed bottom, a continuous closed periphery, and an open top;
    an improvement in providing each bag with hinges in two adjacent layers of the plastic bag in the high speed bag line during the forming of the bag step, the process comprising the steps of:
    juxtaposing at least first and second plastic films of the bag to one another in a disposition for hinging;
    providing at least one compression die on at least one side of the juxtaposed at least first and second plastic films, the compression die having the size and shape of the hinge desired;
    impressing the compression die across the juxtaposed first and second plastic films to produce a temperature and pressure sufficient to form a hinge in the at least first and second plastic films together, the impressing having insufficient temperature and pressure to permanently fuse the first and second plastic films together so that the films when folded at the hinge each retain structural integrity sufficient to form the bag.

2. The process of hinging at least two layers of plastic film material together in a high speed plastic bag line according to claim 1 wherein the forming of the plastic bag step includes:
    two front panel gussets, each front panel gusset connected to one of the two substantially parallel side edges of the front panel;
    two rear panel gussets, each rear panel gusset connected to one of the two substantially parallel side edges of the rear panel;
    each front panel gusset connected to a rear panel gusset;
    each of the panel gussets foldable between the front panel and the rear panel; and,
    the bottom joins to the front panel gussets and the rear panel gussets; and,
    wherein the impressing the compression die step includes:
        impressing the compression dies across a gusset panel.

3. The process of hinging at least two layers of plastic film material together in a high speed plastic bag line according to claim 2 wherein the forming of the plastic bag step includes:
    impressing at least six second linear hinges configured in each front panel, front panel gusset and rear panel and rear panel gusset, the at least six second linear hinges beginning at a junction of the first hinge to the gussets and extending centrally of the bag to permit respective folding of the front panel, rear panel, front panel gussets and rear panel gussets to form a rectilinear bottom of the bag.

4. The process of hinging at least two layers of plastic film material together in a high speed plastic bag line according to claim 3 wherein the forming of the plastic bag step includes:
    impressing the at least eight second linear hinges are configured in each front panel, front panel gusset, rear panel and rear panel gussets to form a rectilinear bottom of the bag.

5. The process of hinging at least two layers of plastic film material together in a high speed plastic bag line according to claim 4 wherein the forming of the plastic bag step includes:
    impressing the at least eight second linear hinges are configured in each front panel, front panel gusset, rear panel and rear panel gussets.

6. The process of hinging at least two layers of plastic film material together in a high speed plastic bag line according to claim 3 wherein the forming of the plastic bag step includes:
    impressing each of the hinges is angularly inclined with respect to the bottom of the bag.

7. The process of hinging at least two layers of plastic film material together in a high speed plastic bag line according to claim 2 wherein the forming of the plastic bag step includes:
    impressing at least four second linear hinges configured in each front panel gusset and rear panel gusset, the at least four linear hinges beginning at the bottom of the bag and extending a side edge of the bag to permit respective folding of the front panel, rear panel, front panel gussets and rear panel gussets to form a rectilinear bottom of the bag.

* * * * *